United States Patent [19]

Gagnon

[11] 4,359,101
[45] Nov. 16, 1982

[54] GROUND PREPARATION TOOL FOR REFORESTATION

[76] Inventor: Michel Gagnon, P.O. Box 236, La Malbaie, Quebec, Canada

[21] Appl. No.: 84,416

[22] Filed: Oct. 12, 1979

[51] Int. Cl.³ .................. A01B 9/00; A01B 33/04; A01B 33/10; A01B 63/118
[52] U.S. Cl. .................... 172/38; 172/58; 172/108; 172/117; 172/484; 172/527; 172/532
[58] Field of Search .................. 172/38, 82, 97, 98, 172/99, 107, 108, 109, 117, 119, 124, 484, 477, 527, 532, 58; 37/2 R, 21–23, 43 C, 81, 82, 189; 175/323, 394, 395; 198/661, 660, 664, 665, 676

[56] References Cited

U.S. PATENT DOCUMENTS

| | | |
|---|---|---|
| 53,577 | 4/1866 | Colborn . |
| 562,485 | 6/1896 | Plenty . |
| 874,129 | 12/1907 | Sodekson . |
| 959,031 | 5/1910 | Simmons . |
| 1,073,026 | 9/1913 | Camp . |
| 1,076,745 | 10/1913 | Ciccolini . |
| 1,456,860 | 5/1923 | Turner . |
| 1,659,674 | 2/1928 | Turner ........................ 172/108 X |
| 2,259,864 | 10/1921 | Smith ........................ 172/484 X |
| 2,297,384 | 9/1942 | Benjamin ..................... 172/484 X |
| 2,473,770 | 6/1949 | Seaman ....................... 172/117 X |
| 2,502,468 | 4/1950 | Marihart ..................... 172/108 X |
| 2,580,480 | 1/1952 | Strehlow et al. .............. 172/484 X |
| 2,681,607 | 6/1954 | Glover ....................... 172/119 X |
| 2,705,379 | 4/1955 | Fruhling ..................... 37/81 |
| 2,797,542 | 7/1957 | Webster et al. . |
| 2,997,117 | 8/1961 | Paige ........................ 172/484 |
| 3,174,554 | 3/1965 | Wright et al. ................ 172/82 X |
| 3,571,956 | 3/1971 | Heiberg ...................... 172/477 X |
| 3,624,826 | 11/1971 | Rogers . |
| 3,672,701 | 6/1972 | Blank . |
| 3,714,990 | 2/1973 | Tomik . |
| 3,924,694 | 12/1975 | Baughman et al. . |

FOREIGN PATENT DOCUMENTS

| | | |
|---|---|---|
| 41664 | 1/1893 | Canada . |
| 270963 | 3/1912 | Fed. Rep. of Germany ...... 172/532 |
| 342552 | 10/1921 | Fed. Rep. of Germany ...... 172/532 |
| 467163 | 3/1914 | France . |
| 506304 | 5/1920 | France ........................ 172/38 |
| 155459 | 7/1956 | Sweden . |
| 109446 | 3/1918 | United Kingdom ............... 172/108 |
| 130721 | 12/1959 | U.S.S.R. ..................... 172/117 |
| 609847 | 5/1978 | U.S.S.R. ..................... 172/108 |

Primary Examiner—Paul E. Shapiro
Attorney, Agent, or Firm—Brumbaugh, Graves, Donohue & Raymond

[57] ABSTRACT

This invention relates to an auger and to a plow including such auger. This specification discloses an auger which is suitable for use even in the difficult terrain encountered in typical reforestation operations. An auger in accordance with this disclosure has its axis extending in the direction of movement of the plow and is arranged to rotate in a direction opposing the forward movement of the plow. The auger has a plurality of generally helical turns. Sections of the ground engaging portions around the periphery of the turns have an angle of attack in a plane at a selected angle to the axis of the auger and other sections have angles of attack in planes at a different angle. These ground engaging sections of the periphery are preferably teeth which because of the difference in angles discussed above attack the ground at different cutting angles. The dislodged earth will as is normal with an auger be flung sideways as a furrough is formed, but it will also have a component of motion which is either forward or backwards in relation to the direction of travel of the plow. When, as previously explained the auger is rotating to oppose the direction of the plow, this forward or backward component of motion will depend on the rate of forward movement of the plow less the rearward displacement of particles relative to the auger shaft. While the net effect of the auger is to resist forward motion, selected sections may have an opposite pitch or orientation and those limited sections would have the opposite effect.

20 Claims, 25 Drawing Figures

GROUND PREPARATION TOOL FOR REFORESTATION

This invention relates to an auger and to a plow including such auger.

Although auger types plows are well known, there has been room for improvement in their ability to break up the ground, particularly where the terrain is difficult due to stones, roots and obstructions. Reforestation usually involves such difficult terrain.

After cutting and especially after a forest fire, undesirable vegetation may grow.

Land to be reseeded is composed of trees of various heights, stumps, branches, rocks, moss and topsoil. Planting or seeding is carried out at intervals as close as two meters, depending on the type of tree.

Previously bulldozers were used which removed moss and rocks, effecting a stripping of the topsoil. Erosion follows as a result of rain, since there were not sufficient roots to retain the water. The sun then dries out the earth excessively.

A conventional disk harrow with fixed displacement is not efficient in that it is not able to move rocks and branches and cannot penetrate deeply enough to reach the topsoil.

More modern methods involve using a tractor attached to spiked drums filled with water which plow furrows.

It is impossible to get straight furrows using this method because the chains used to pull the barrels allow the barrels to move in any direction. Branches and other debris collects in front of the barrels, preventing them from penetrating the soil.

An object of this invention is to provide an auger which when suitably mounted, is suitable for use even at the difficult terrain encountered in typical reforestation operations. The auger will also be extremely useful for normal plowing.

An object of this invention in accordance with another aspect is to provide a plow of the auger type with the ability to remove branches, scatter moss, push small rocks, and till the soil making continuous furrows while at the same time having the ability to deflect from large rocks or other immovable obstructions.

An object of a plow in accordance with this invention in its preferred aspect is to include also provision for a wide range of depths of plowing and the ability to form intermittant furrows or seed holes.

An auger in accordance with this invention has its axis extending in the direction of movement of the plow and is arranged to rotate in a direction opposing the forward movement of the plow. The auger has a plurality of generally helical turns. Sections of the ground engaging portions around the periphery of the turns have an angle of attack in a plane at a selected angle to the axis of the auger and other sections have angles of attack in planes at a different angle. These ground engaging sections of the periphery are preferably teeth which because of the difference in angles discussed above attack the ground at different cutting angles. The dislodged earth will as is normal with an auger be flung sideways as a furrough is formed, but it will also have a component of motion which is either forward or backwards in relation to the direction of travel of the plow.

As stated above, the auger rotates to oppose forward motion. As used in the present application, the phrase "oppose forward motion" or the like means that while the net effect of the auger is to resist forward motion by pushing soil forward, some portions of the auger may be arranged to impart a rearward component of motion to the soil during part of the rotation cycle. When as previously explained the auger is rotating to oppose the direction of the plow, the net forward or backward movement of the soil will depend upon the rate of forward movement of the plow and thereby the auger shaft, plus or minus the forward or rearward (respectively) displacement of particles caused by the auger teeth. The net soil motion will be forward if the result is positive and backward if the net result is negative. This rearward displacement will depend on the angle of attack of the cutting teeth or other cutting sections of the auger. With an auger in accordance with this invention in which there are varying angles of attack of the cutting teeth the consequent result will be to give the dislodged particles of earth successively forward and rearward components of motion relative to the shaft. Such motions contribute to an enhanced action in loosening and turning the soil.

These difficult angles of attack may be achieved by varying the pitch within individual turns of the helix or by retaining the pitch constant and having teeth of various angles of attack in relation to an axial direction.

In accordance therefore with this invention in a broad aspect an auger is provided adapted for use as a plow to be drawn in a substantially axial direction comprising a plurality of generally helical turns having a ground engaging section of its periphery shaped to have an angle of attack in a plane at a selected angle to the axis of the auger and at least one additional section of the periphery shaped to have an angle of attack in a plane at an angle to the axis of the auger different from said selected angle.

Another aspect of this invention is the vehicle which mounts the auger. A parallelogram linkage is provided between the mounting of the auger and the vehicle and has a number of advantages in that this will also maintain the axis of the auger in a constant relationship with the horizontal at various depths of plowing. There can be means such as a hydraulic cylinder connecting between the frame of the vehicle and part of the parallel linkage for raising and lowering the auger. Furthermore there can be resilient means such as a spring to permit the auger to rise to override obstacles. In accordance with a preferred aspect of this invention there is a double parallelogram linkage including a common link and a hydraulic cylinder or similar arrangement for changing the angles between the links of the two parallelograms connected to the common link so as give increased depth of plowing or to provide seed holes. Other preferred inventive aspects include pivoting an upright member on the vehicle supporting the auger for movement about a vertical axis against the influence of buffer springs to give limited ability of the auger to deflect laterally to help avoid an obstacle, also the provision of a shoe in advance of the auger to guide it over obstacles. This shoe has an upwardly and forwardly inclined leading surface of which the leading coil of the auger may be a continuation. There is furthermore an advantage in providing a counter weight for the auger and its mounting assembly as the plow can then float under the influences of desired downward pressure exerted by a spring or the like and will more readily override obstacles than if the full weight of the auger and its mounting was bearing down.

In accordance therefore with a broad aspect of the plow of this invention there is provided a plow comprising an upwardly extending support member mounted on a vehicle, an auger type plow member, means for mounting said plow member with the axis of its auger extending in the direction of travel of the vehicle, driving means for the auger on said means for mounting, connecting links providing a parallelogram linkage between the upwardly extending supporting member and the means for mounting the plow members so that the auger can be raised and lowered without changing the relationship between the axis of the auger and the horizontal, means for raising and lowering the means for mounting the plow member and spring means acting on the parallelogram linkage to case the auger to exert downward pressure on the ground while permitting the auger to rise to override obstacles.

In the drawings which illustrate the preferred embodiments of this invention.

In certain embodiments the device according to the present invention may be used on farm land to plow furrows, and to loosen soil. The auger is thus equipped with a back deflector to flatten the edge of the furrow; a seeder or an arrangement incorporating a double plow can be added to fill the furrow; or a strawing machine can be added to increase the bulk of light soil.

Figure 1:
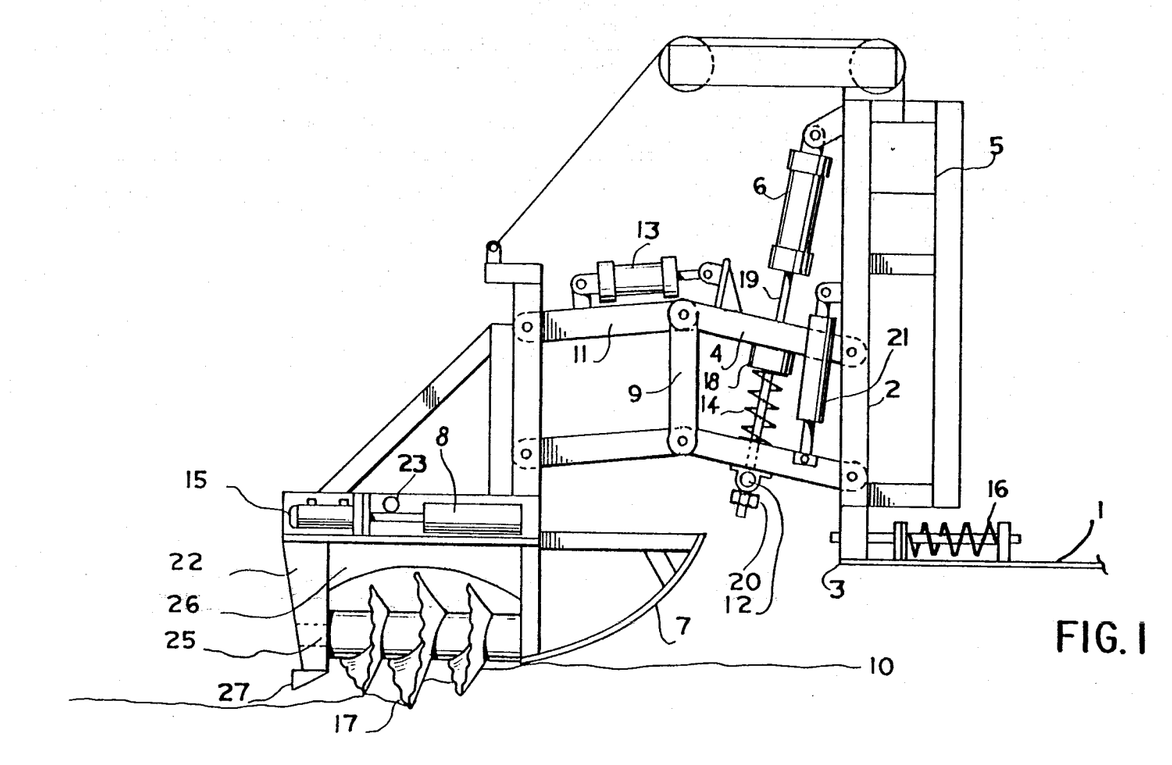
FIG. 1 is an elevation view of a plough in accordance with this invention.

Referring now to FIG. 1 of the drawings, on a platfrom (1) of a tractor or a trailer, a vertical support (2) is mounted on a pivot (3). The vertical support (2) supports a counterweight (5), a hydraulic jack (6) and a parallelogram (4) which, through a second parallelogram (11), supports the plow (17) itself. A central pivot (3) is attached under the vertical support (2), held on its shaft by a spring system (16) and kept tight by a set of nuts. To this central pivot-vertical rise system (3, 2) is attached the base of the parallelogram (4) whose vertical movement of its non-supported end (9) is parallel to the support (2) and perpendicular to the ground to be plowed (10). A second parallelogram (11) allows a more pronounced angle which increases the penetration of the ground. A counterweight (5) can be added to the jackspring neutralizer (6, 14) to counterbalance the weight of the plow, such that the vertical movement of the jack (6) would be directly proportional to the pressure exerted on the spring (14) in its relaxed position, and by the same token on the parallelogram (4).

The end (12) of the hydraulic jack is attached at approximately one seventh the length of the tiltable arms of parallelograms (4) and (11), such that the vertical displacement of the plow will be seven times the displacement of the rod of the jack (6). A second jack (13) attached to the parallelogram (11) allows greater displacement upwards or downwards. At spring (14), tension applied to the rod of the jack (6) during the digging of seed holes, makes raising of the parallelogram (4) more difficult while facilitating lowering. When the shoe (7) or the auger (17) hits an object, the spring (14) compresses.

In the invention's preferred state, the hydraulic power needed to make the system work is provided by a hydraulic pump activated by a sufficiently powerful diesel engine with a gear system. The hydraulic pressure of the pump varies from 3 MPa to 30 MPa. A regulator and a valve system supply hydraulic oil to the two sides of the jacks (6, 18), the hydraulic motor (15) and the hydraulic jack (13) used to dig the seed holes. The horizontal part of the support (2) has a double spring (16) which reacts to the lateral action of the auger (17) and automatically realigns the auger and the spring after they have moved to avoid an obstacle. A shock absorber can be added to these springs in order to dampen the oscillations.

The spring (14) is secured at the end of the hydraulic jack (12) and its tension is regulated by a pressure variator, a hollow concentric jack (18) integrated with the rod (19). The nut (20) at the end of the rod is used to raise the plow (17) and to keep it attached to the parallelogram (4) at the desired angle. There is also a shock absorber (21) which tempers the vertical thrust of the auger (17) when it is violently moved upwards when the deflector or shoe (7) runs into a large rock or obstacle which it must surmount. This shock absorber (21) also helps to slow down the lowering of the machine after it passes over an obstacle.

The auger is activated by a hydraulic motor (15) through a gear case (8); they are supported by a steel structure (22) which is able to pivot on an axis (23) used to adjust the angle at which the auger (17) works.

Figure 2:
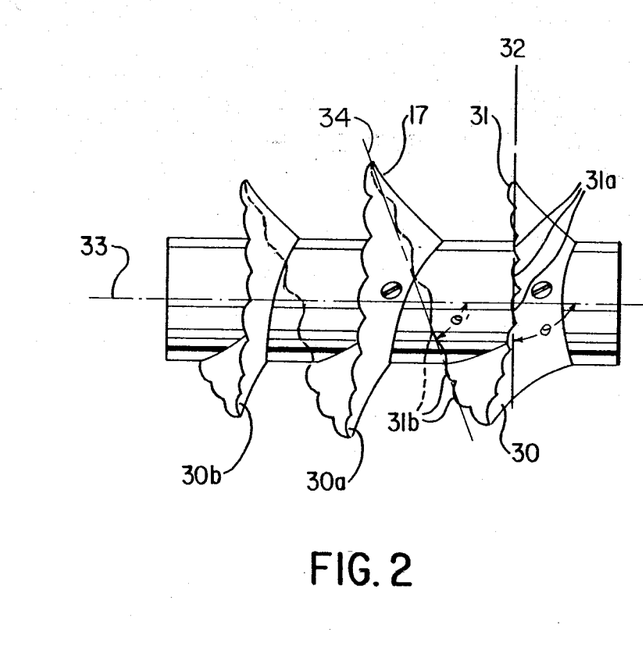
FIG. 2 is an elevation view of an auger in accordance with this invention.

In the invention's preferred state as illustrated in FIG. 2, the auger has a minimum of three coils or turns to cover the ground. If there were only two coils, the soil would not be broken up as effectively since the first coil displaces the material, the second coil begins to break up the material and the third coil completes the operation. Under certain conditions where the soil is extra difficult to break up, there can be as many as five coils. But it is preferable for reasons of economy and to develop adequate pressure against the ground, to use as few coils as will accomplish the intended object.

In FIG. 2 the auger includes turns identified as 30, 30a and 30b. It will be noted that the edge of each turn is scalloped to provide ground engaging teeth 31. It will be noted that a series of teeth 31 such as teeth 31a move in a plane 32 which is at an angle θ with the axis 33 of the auger. Angle θ is approximately a right angle. Other teeth such as 31b, some of which are shown by dotted lines move in a plane 34 which is at an angle θ' less than and different from angle θ. Thus the periphery of each turn has sections at different cutting angles.

Figure 3:
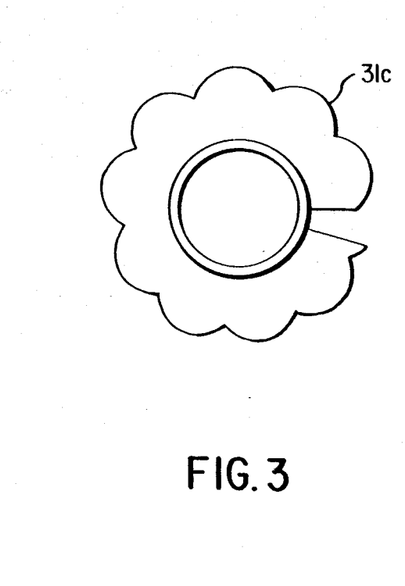
FIG. 3 is an end view of a variation of the auger shown in FIG. 2.

The rotational velocity of the auger (17) depends on the speed of the motor (15) whch is variable and controlled by the hydraulic system. In the invention's preferred state, the auger (17) is shaped so that a particle in its path goes forward and backward (FIG. 5) during the run of each coil, i.e. three times, before being thrown to the side of the furrow. As illustrated in FIG. 2 and also in FIG. 3 (which shows a variation with fewer teeth (31C) than FIG. 2) each particle or object to be removed is in contact with a set of teeth (31), aligned successively to provide different cutting angles. The auger essentially becomes a system which continuously carries three sets of teeth, each tooth performing a specific operation and causing a forward and backward movement of material relation to the auger shaft so that the soil is cut and thrown three times before being completely loosened. These three movements efficiently dislodge rocks, roots and other obstacles and mixes the soil and the humus; thus the turning and loosening up of the soil is a one-step operation. Moreover, because of the continuous action of the auger, the danger of teeth breaking is minimized. In FIG. 2, there is basically in each turn one set of teeth that move in a plane at angle θ and another set moving in a plane at angle θ' to provide one cycle of forward and backward movement, relative to the auger shaft, for each turn. It will however be appreciated that, particularly if the diameter of the auger were enlarged, there could be two cycles to each turn, in which event two turns should give good results.

The shape of the teeth (31), is such that they are not too sharp to cut directly into the soil, but sharp enough to hit the ground quickly. In the invention's preferred state, the amplitude of the vibration of the teeth is proportional to the height of the coil in relation to the axis of the auger, at the position of the tooth, or 30 mm for a 300 mm height of coil and 15 mm for a 150 mm height of coil, that is approximately 10%.

The length of the arc of the tooth is important. It is proportional to the height of the coil with respect to the axis of the auger. In its preferred state, the invention has an auger 500 mm in diameter, and the length of the teeth are approximately 150 mm; there will be approximately 29 periods or teeth in a length of 4300 mm developed from the irregular spiral.

For continuous scarification, it is advantageous that the teeth not be symmetrical from one turn to another.

In the invention's preferred state, the auger should have 29 teeth placed in such a way that if the tractor moves forward at a speed of 11.7 m/min. the results are:

| Teeth | Linear Distance of Projection (mm) | Period for (sec) | Linear Speed (m/sec) | Average Peripheral Speed (m/Min) | Resulting Speed (m/min) |
|---|---|---|---|---|---|
| 1 to 3 towards the front | +110 | 1.45 | 4.6 | +35 | +47 |
| 3 to 5 towards the back | −40 | 1.00 | −2.4 | −18 | −6 |
| 5 to 12 towards the front | +220 | 3.40 | 3.9 | +30 | +42 |
| 12 to 15 towards the back | −30 | 1.45 | −1.2 | −9 | +3 |
| 15 to 23 towards the front | +220 | 3.85 | 3.4 | +26 | +38 |
| 23 to 25 towards the back | −20 | 1.00 | −1.2 | −9 | +3 |
| 25 to 29 towards the front | +90 | 1.90 | −2.8 | +21 | +33 |
| Total | 540 | 14.05 | 2.35 | 18 | +30 |

The above table indicates the Linear Speed (and direction) of blade movement, i.e. speed in the direction of angle θ, for various angles of attack of the teeth. The Average Peripheral Speed, i.e. speed in the axial direction of the ground engaging teeth relative to the shaft, can for some of the teeth be in the opposite direction to that of the tractor. As shown in the "Resulting Speed" column of the table, such instantaneous rearward component of motion can offset the forward speed of the tractor (11.7 m/min.) resulting in a momentary zero speed or small backward not movement of such teeth, and thereby the soil, relative to the ground. However, while portions of the blade may be shaped so that those particular portions, e.g. teeth 3–5, 12–15 and 23–25 in the table above, impart a backward component of soil movement, in the aggregate the auger blade teeth impart a forward movement to the soil to oppose forward motion of the tractor.

Figure 6:
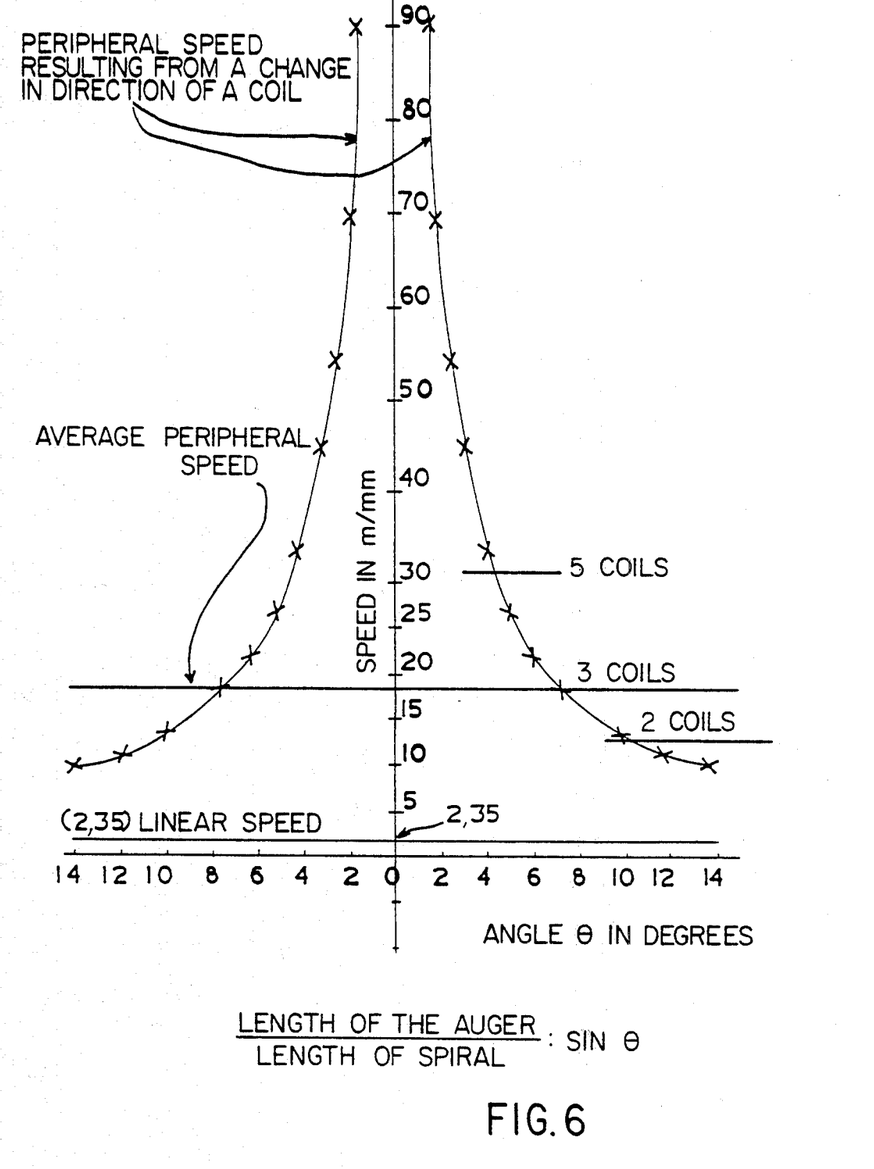
FIG. 6 is a plot illustrating the relationship between peripheral speed, linear speed and the angle between the axis of the auger and the plane of the teeth, that is to say the angle of attack.

Furthermore, as the angle increases between the length of the auger and the length of the unwound coils, or if the number of coils is increased, the ratio $$\frac{(\text{peripheral speed})}{\text{linear speed}}$$

increases more rapidly (as illustrated in FIG. 6), to a point where if the angle is reduced momentarily from 6.5 degrees to 0.5 degrees, the speed ratio is increased tenfold, i.e. from 9 to 90. Correspondingly, the rate at which the particles are thrown to the outside increases.

Figure 5:
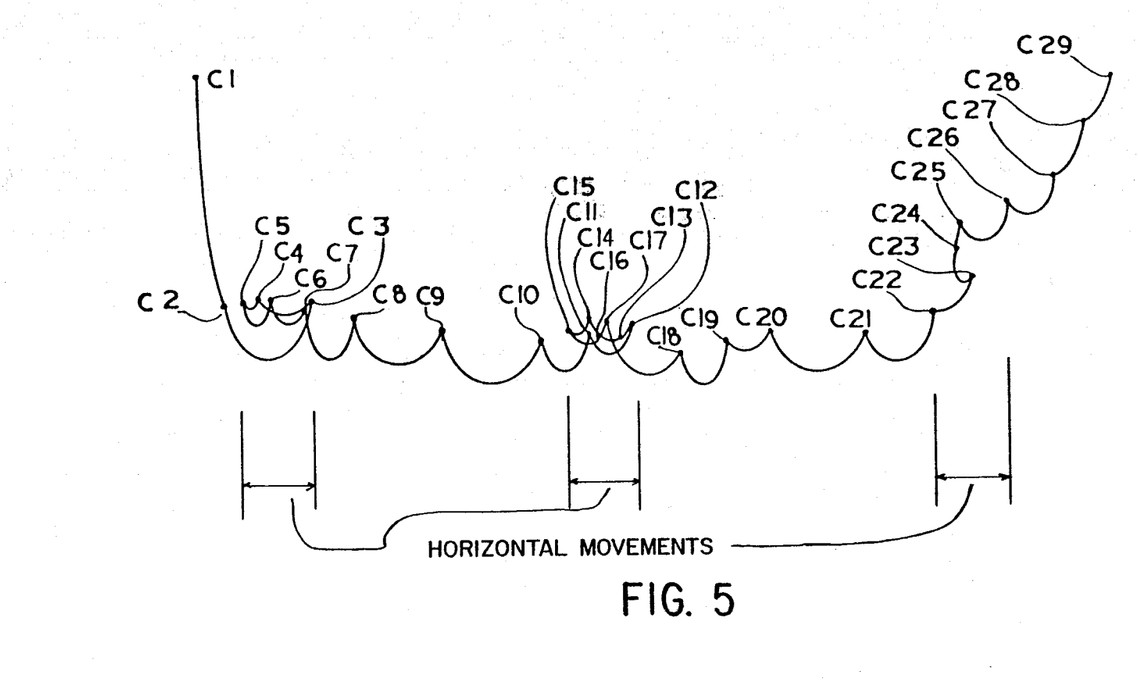
FIG. 5 is a diagram of the linear displacement of one point on the auger.

FIG. 5 shows the linear displacement of one point on the auger. The hollows between the teeth are numbered C1, C2 . . . C29. The backward movement is shown by the horizontal run of the teeth. As shown in FIG. 1, the auger (17) has a blade deflector (26) which breaks the branches and prevents them from interfering with the operation of the machine. The blade (26) is located on the unloading side of the auger (17).

As illustrated in FIG. 1, the back support bearing (25) of the auger (17) is resistant enough to absorb the deflection shock and is protected by another deflector (27) on return to normal operation after having avoided an obstacle.

Figure 4:
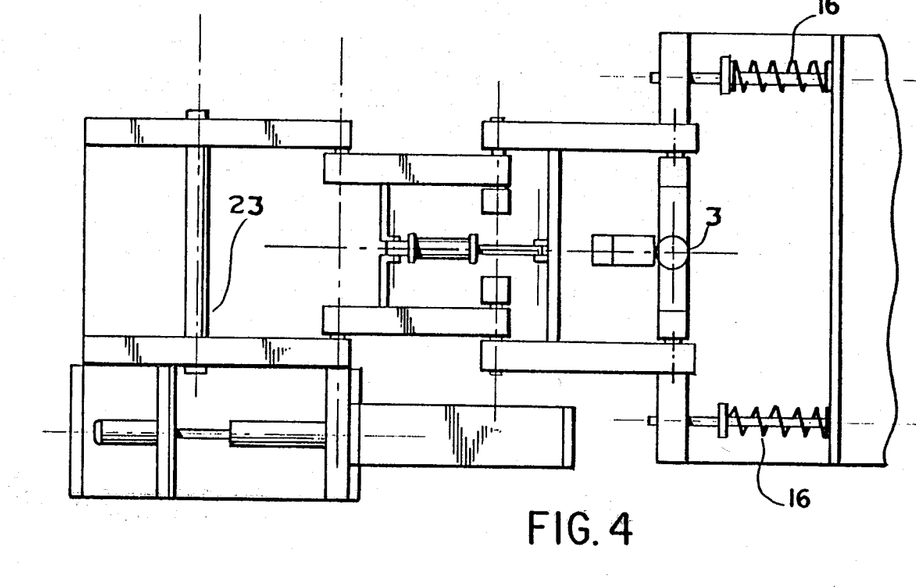
FIG. 4 is a plan view illustrating certain elements of the embodiments of FIG. 1.

FIG. 4 illustrates the effect of the reaction of the springs (16) in relation to the action of the auger (17). This figure also illustrates the pivoting axis 3 of the auger (17).

The invention's auger system as described above attains the objectives of this invention. It can loosen the soil in a continuous row or with seed holes. In the case of seed holes, the plowing rate is inversely proportional to the distance between holes and directly proportional to the velocity of the tractor, so that for a speed of one meter per second and a distance of two meters between holes, the rate is 0.5 holes/second or one hole every two seconds.

The rotation speed of the auger is proportional to the forward speed of the tractor. It has been found that if the tractor advances at a speed of 1.8 km/h or 0.5 m/sec, the rotation of the auger will be approximately 34 r.p.m. and if the tractor advances at 5.6 km/h (1.5 m/sec), the rotation of the auger will be 105 r.p.m. The rotation of the auger results in a linear displacement of a particle at the surface of the soil, so three rotations are necessary for a complete linear displacement of the length of the auger. The auger velocity of 105 r.p.m. divided by the three rotations, and multiplied by the length of auger of 560 mm equals 19.6 meters per minute or 0.32 meters per second of linear displacement for a tractor velocity of 1.56 meters per second.

The velocity of 0.32 m/sec corresponds to approximately 20% of the velocity of the tractor which is 1.56 m/sec. On the other hand, the tangential velocity of the auger, with average diameter of 500 mm, is 2.53 meters/second, which represents 160% of the speed of the tractor, and resulting in the throwing of displaced material.

The auger rotation as previously explained opposes the forward motion of the tractor which has a tendency to make the tractors back up. However, this restraining force is but a small component of the total resistance of the auger; the major part of the component works at a perpendicular angle to the forward motion to drop off the displaced material on the sides of the furrows. The invention, in its preferred state, has a two-auger system which neutralizes the lateral force. The lateral force is balanced by a system of compressed offset springs whose central pivot allows a maximum deflection of one meter from normal trajectory, in the invention's preferred state, when the plow hits an obstacle.

To maintain the direction of the plow and to keep the furrows parallel, the compressed spring on one side of the plow is stronger than the spring in tension on the other side. To enable the auger to climb over a vertical obstacle, a deflector shoe has been placed in front of it. The auger is shaped so that the deflector shoe is released which causes a force on the opposite end of the parallelogram. The displacement towards the top of the parellograms compresses the spring located on the end of the rod of the hydraulic jack and permits angular movement of the parallelogram without affecting the displacement of the hydraulic jack.

It has been found that in order to facilitate and prepare for a sudden upward movement of the system, it is desirable for the rod of the hydraulic jack and spring to have an integral jack to create a slight spring tension, which balances the weight of the plow. When meeting an obstacle, there are vertical forces upward and downward on the parellogram, where the spring reactions varies from tense to released to compressed; this action positions the plow in the bottom of the furrow.

A shock absorber diminishes the shock to the spring until the parallelogram takes its fixed position at the nut on the end of the rod of the hydraulic jack. The position of the parallelogram is adjusted by the nut so that the hydraulic jack will lift the system.

To maintain or modify the depth of the furrow as desired, first measure the vertical distance between the flat end of the deflector and the end of the lowest coil of the auger, at the selected angle. The slope of the auger is adjustable by means of an integral pivoting auger-motor-shoe system. In the invention's preferred state, the angles varies from −5° to +15° with respect to the level of the ground. At this moment, one can plow deeper because the deflector rests on the ground and the auger rotates in the air after having dropped its load.

The variable force of the auger is applied through the first parallelogram which is activated vertically by the hydraulic jack. There is a spring which compresses at the end of this hydraulic jack to give the force needed to break up the ground; a pressure of 2.7 MPa is necessary to plow 10 cm and a pressure of 5.4 MPa is necessary to plow 20 cm in a soil of uniform texture.

The shape of the deflector shoe assures a continuous angle with the path of the front coil of the auger, such that the auger and the deflector push the parallelogram to its top position to avoid immovable objects such as large rocks.

Figure 7:
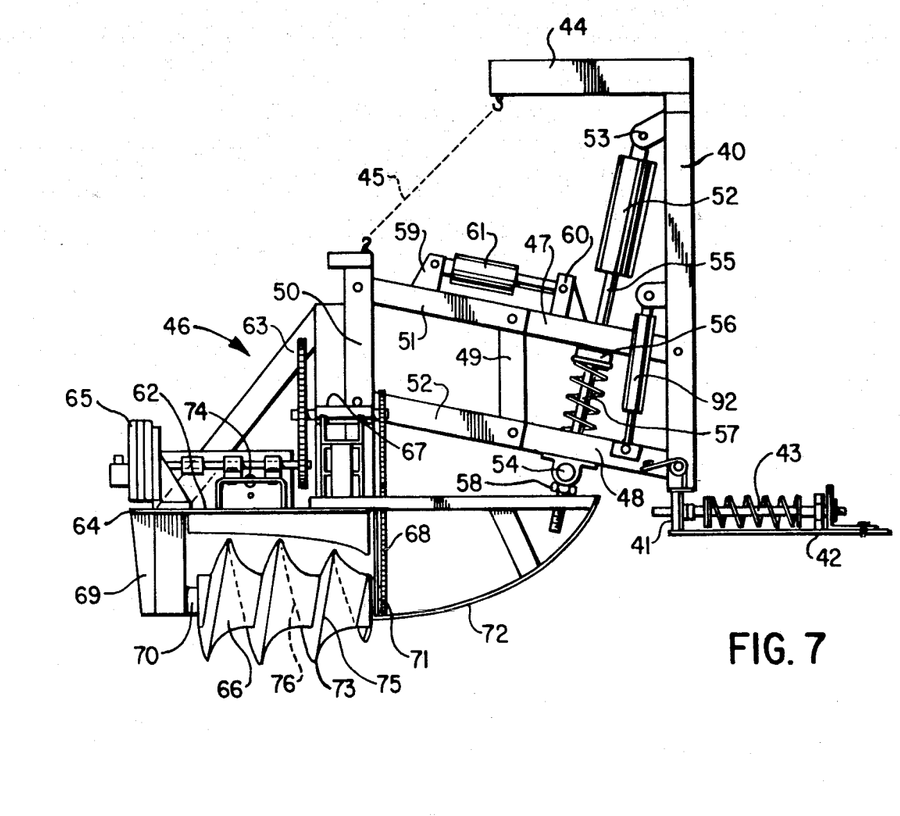
FIG. 7 is a side elevation view of the alternative embodiments of this invention.

FIG. 7 illustrates an alternative embodiment of the invention in which upwardly extending member 40 is pivotally mounted by pin 41 on the vehicle platform 42 for movement about a vertical axis. In a similar manner to that illustrated in FIGS. 1 or 4 springs 43 are arranged to act as buffer springs to oppose rotation of member 40 and to cause it to return to its initial position after temporary deflection to avoid an obstacle. A shock absorber may also be added to these springs. Cantilever 44 is joined to the top of member 40 to provide a support through chain 45 for an auger and mounting assembly generally indicated by the numeral 46.

Auger mounting assembly 46 is connected to upright member 40 by a double parallelogram linkage comprising parallel links 47 and 48 which combines with upright member 40 and link 49 to form the frong parallelogram. Link 49 is parallel to an upright member 50 forming part of the auger mounting assembly and this provides a common link between the two parallelograms.

The second parallelogram is completed by parallel links 51 and 52.

Hydraulic cylinder 52 is pivotally secured to member 40 at 53 and to link 48 at 54 to raise or lower the parallelogram linkages and hence auger assembly 46. On the shaft 55 of the piston of the hydraulic cylinder, there is a collar 56, compression spring 57 bears on collar 56 and link 48 exerting a pressure controlled by adjustment nut 58. Spring 57 enables auger assembly 46 to rise to override an obstacle.

The angle between links 51 to 52 on the one hand and links 47 and 48 on the other hand is controlled by hydraulic piston 61 connected to lugs 59 and 60 which are in turn mounted on links 51 and 47 respectively. The double parallelogram linkages thus provided gives both increased depth of plowing and increased flexibility of control of the depth, particularly where it is desired to make spaced seed holes.

The auger assembly comprises upright member 50 connected to horizontally extending frame member 62. Brace 63 connects members 50 and 62. Frame member 62 supports platform 64 on which is mounted auger motor 65 which drives auger 66 through shaft 67 and chain drive 68. Auger 64 has at its trailing end support 69 in which its shaft 70 is journaled and at its leading end support 71 and shoe 72 which slopes upwardly and forwardly preferably with a convex contour so as to cause the auger to ride over obstacles. The edge of the leading turn 73 of the auger is substantially in alignment with the slope of shoe 72 to assist in achieving this.

The entire assembly of auger 73 platform 64 and motor 65 is pivoted for limited motion with respect to member 62 by pivot 74 to provide for minor departures from the horizontal of the axis of the auger. The auger 66 is illustrated as having three turns which in this case are not scalloped so that the periphery is smooth. The earth engaging periphery of the auger will however include sections such as 75 at a different angle of the axis of the auger to other sections such as 76 to create the possibility of backwards and forwards movement of the ground as the auger advances.

Figure 8:
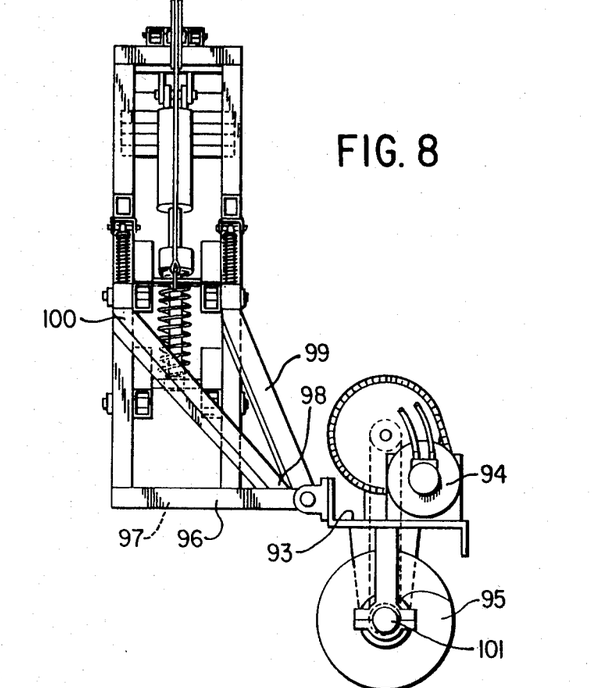
FIG. 8 is an end elevation view of another embodiment.
Figure 9:
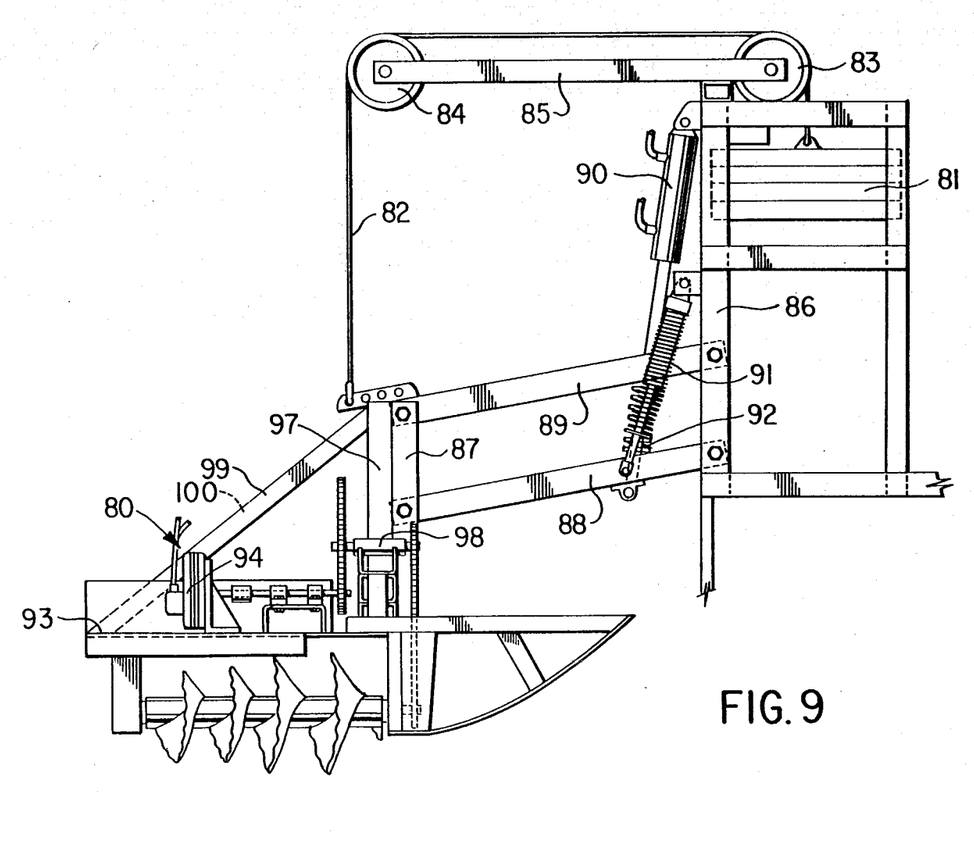
FIG. 9 is a side elevation view of the embodiment of FIG. 8.
Figure 10:
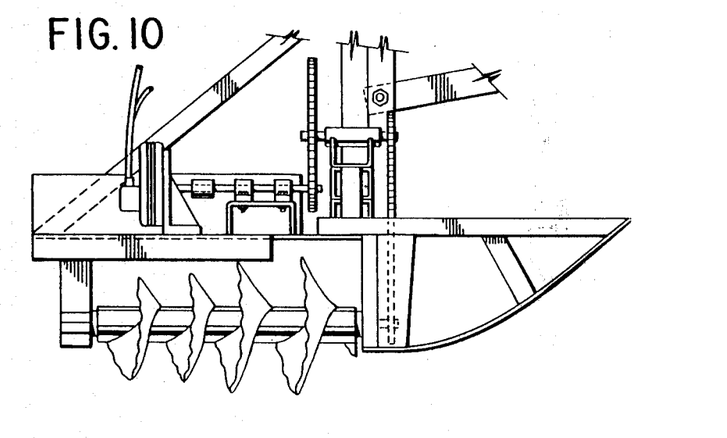
FIG. 10 is a detail view of the auger in FIG. 9.

The embodiment illustrated in FIGS. 8, 9 and 10, is similar to the previous embodiments. In this case however the weight of the auger assembly 80 is counterbalanced by weights 81, which are connected to assembly 80 by link 82 passing over pulleys 83 and 84 on cantilever arm 85. Also in the embodiments of FIGS. 8, 9 and 10; there is a single parallelogram to connect upright member 80 with an upright frame member 87 forming part of the auger assembly. Parallel link 88 and 89 define the parallelogram. Hydraulic piston 90 is joined to member 86 raises and lowers link 88 to control the height of the auger assembly, except when the auger assembly rises against the resistance of spring 91. A damper 92 is also joined between members 86 and 88.

FIGS. 8 and 9 illustrate the connections between member 87 and the platform 93 on which the auger motor 94 is mounted and below which there is the auger 95 itself. These connections include frame members 96, 97 and 98 which form a triangle supported by braces 99 and 100 so that the axis 101 of the auger will be offset from the structure, such as upright members 86, by which the assembly is mounted on a vehicle. This enables ground that cannot be travelled by the wheels of the vehicle to be plowed by the auger.

Figures 11, 12:
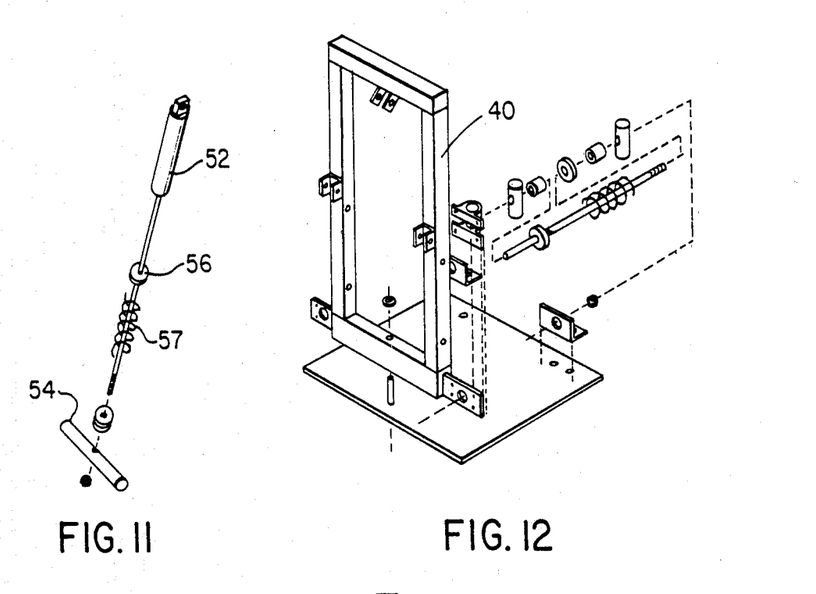
FIG. 11 is an exploded perspective view of the hydraulic cylinder and contract spring of FIG. 7.
FIG. 12 is an exploded view of the frame members 40 and the damper 92 shown in FIG. 7.

FIGS. 11 and 12 are an exploded perspective view of components already described in connection with FIG. 7.

Figures 13, 14:
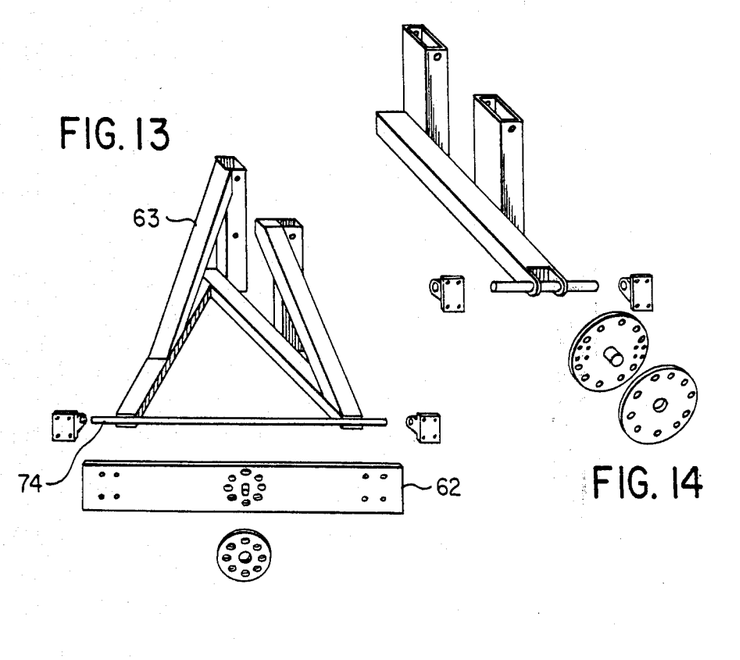
FIG. 13 is an exploded view of the auger assembly frame of FIG. 7.
FIG. 14 is a further exploded view of the auger assembly frame of FIG. 7.
Figures 15, 16, 17, 18, 19, 20:
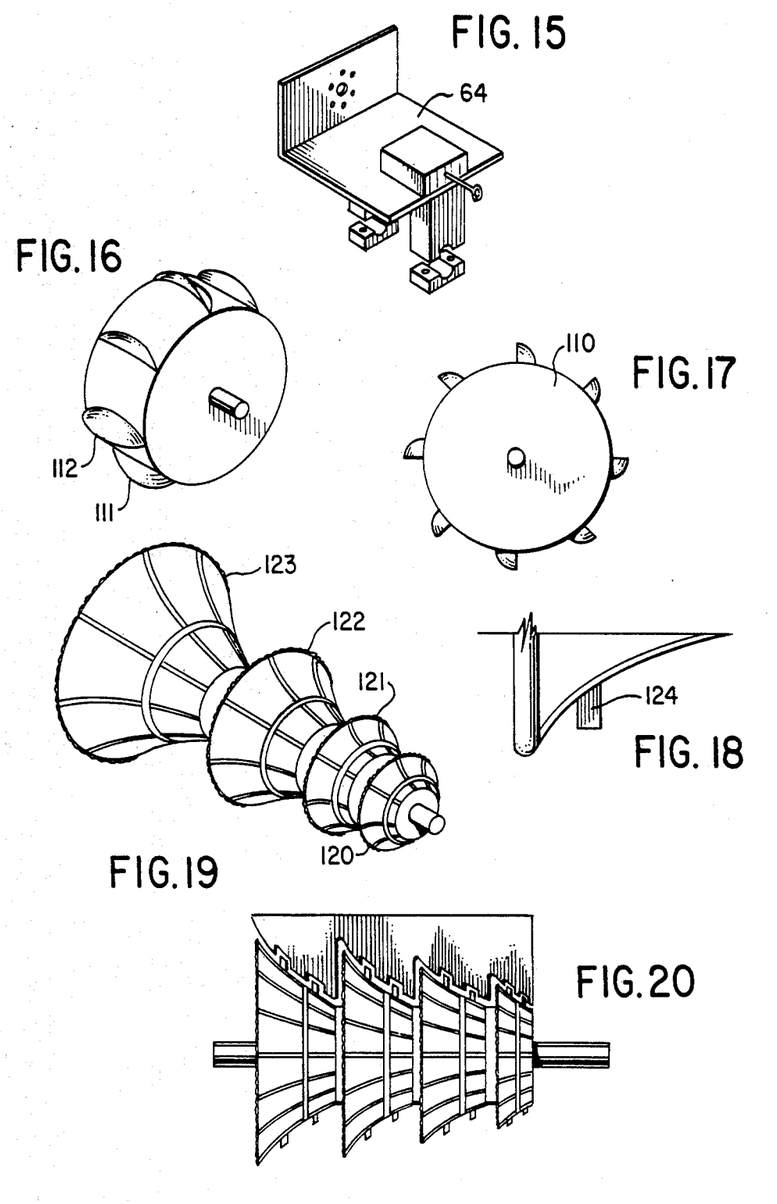
FIG. 15 is a detail view of the supporting platform of the auger motor.
FIGS. 16 and 17 are a perspective of end view of suitable wheels for the plow vehicle.
FIGS. 18, 19 and 20 are views of an alternative auger.

FIGS. 13 and 14 and 15 illustrate elements described in FIG. 7 and show a triangular frame similar to that described in connection with FIG. 8 and in particular, illustrate in greater detail the structure and the action of pivot 74.

FIGS. 16 and 17 illustrate suitable wheels for the vehicle consisting of hub 110 and treads 110 which are shaped to have a curved contour 112 transverse to the wheel and a generally triangular shape when regarded in side elevation to facilitate transversing rough terrain. However, more conventional wheels may be preferred.

FIGS. 18, 19 and 20 an alternative auger is shown in which the turns of the helix 120, 121, 122 and 123 are of increasing diameter so as to follow a generally conical contour. Also illustrated are vanes 124 to assist in disturbing the ground.

Figure 21:
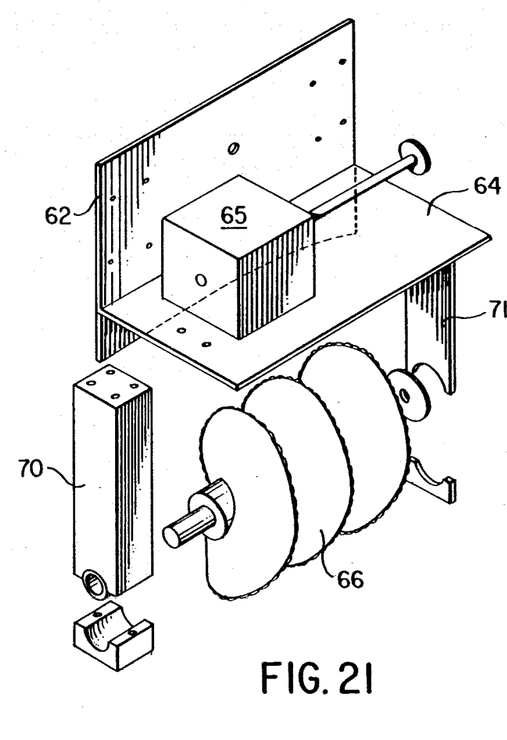
FIG. 21 is an exploded view of the auger and support.

In FIG. 21 there is an exploded view of the auger and support shown in FIG. 7.

Figure 22:
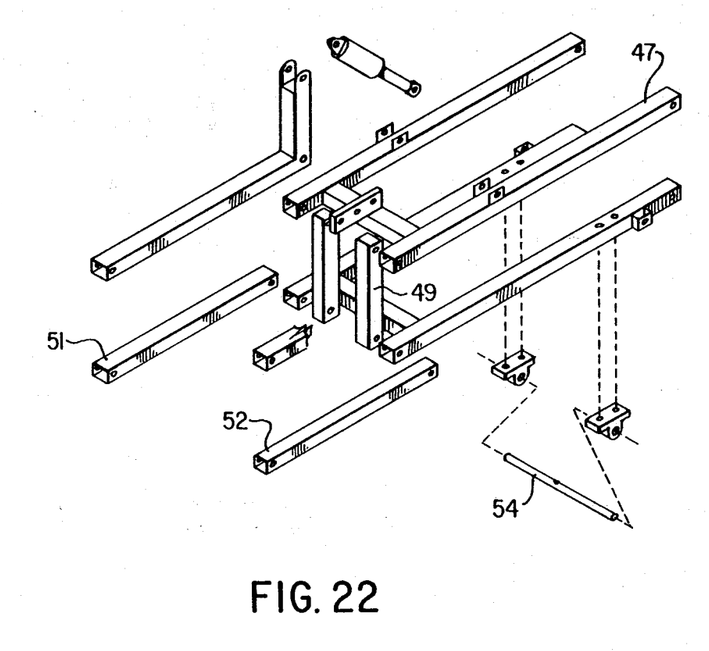
FIG. 22 is an exploded view of the parallel linkage of FIG. 7.
Figure 23:
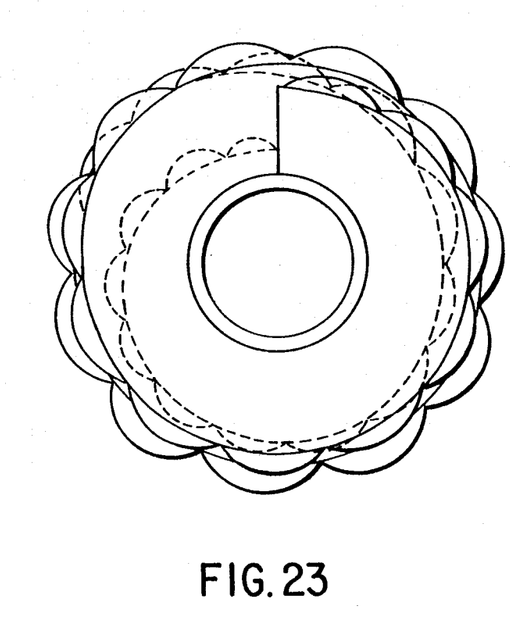
FIGS. 23 and 24 show an alternative embodiment of the auger design, namely an end elevation and side elevation.
Figure 24:
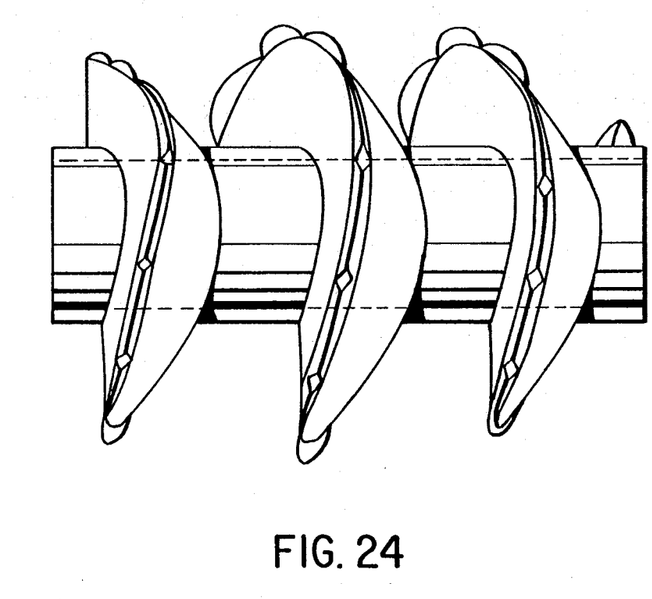
Figure 25:
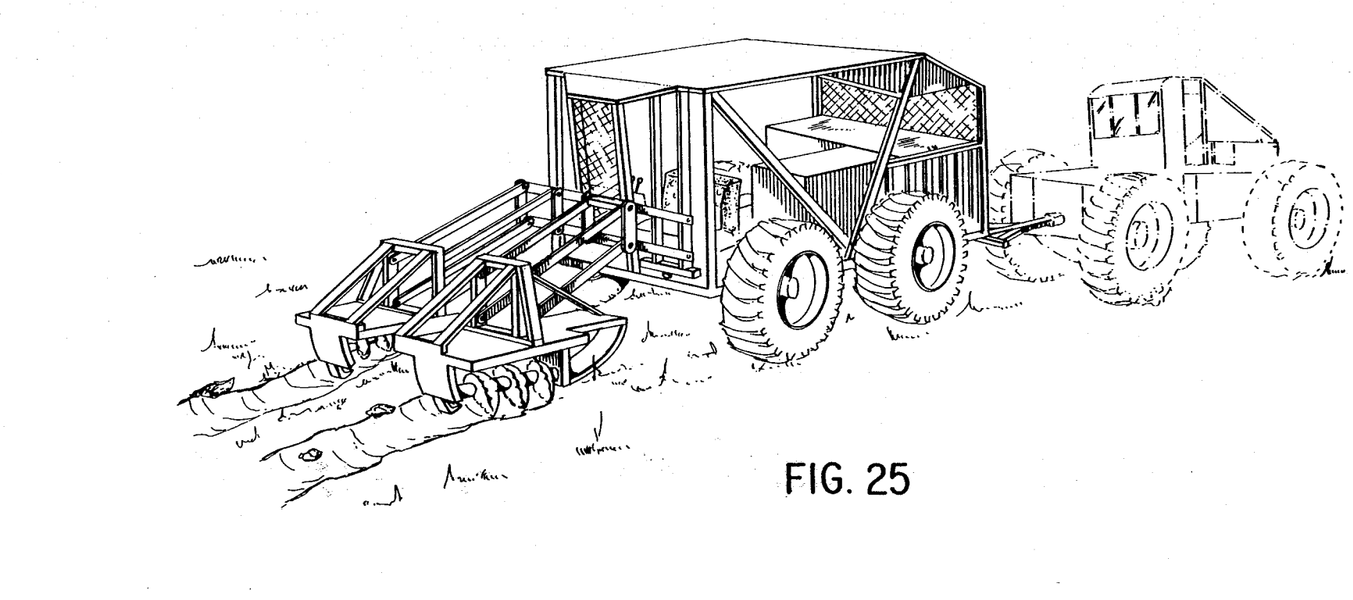
FIG. 25 is a perspective view of one embodiment of the auger device showing the interaction with a tractor.

FIG. 22 is an exploded view further illustrating the double parallelogram linkage of FIG. 7.

It will be apparent from the foregoing that an auger in accordance with this invention and also a plow in accordance with this invention are well adapted to provide improved soil treatment particularly when the terrain is difficult.

The embodiments of the invention in which an exclusive property or privilege is claimed are defined as follows:

1. An auger adapted for use as a plow to be drawn in a substantially axial direction and rotated to oppose forward motion comprising a plurality of generally helical turns having a ground engaging section of its periphery shaped to have an angle of attack in a first plane at a selected angle to the axis of the auger and at least one additional section of the periphery shaped to have an angle of attack in a second plane at an angle to the axis of the auger different from said selected angle, said periphery being scalloped to provide ground engaging, generally outwardly rounded teeth, said teeth including one series of consecutive convex teeth disposed to meet the soil in said first plane, and at least one additional series of convex teeth disposed to meet the soil in said second plane.

2. A device as claimed in claim 1 in which each turn of the auger has one section of its periphery in a plane disposed at a first angle to the axis of the auger and an additional section of its periphery in a plane disposed at a second angle to the axis of the auger.

3. A device as claimed in claim 2 in which the auger has at least two turns.

4. A device as claimed in claim 1 in which the auger at least two turns and in which the periphery of each turn includes one series of convex teeth in a plane disposed at a first angle to the axis of the auger and an additional series of convex teeth in a plane disposed at a second angle to the axis of the auger.

5. In a plow an auger, means for drawing said auger in a substantially axial direction, means for rotating said auger in a direction opposing forward motion of the means for drawing the auger, said auger comprising a plurality of generally helical turns having a ground engaging section of its periphery shaped to meet the soil in a plane which is at a first angle to the axis of the auger selected to result in ground engaged by said section of the periphery having a small forward component of movement and at least one additional section of the periphery shaped to meet the soil in a plane which is at a second angle to the axis of the auger selected to result in ground engaged by the additional section having a large forward component of movement when the auger is drawn forward.

6. A device as claimed in claim 5, wherein each section at said first angle and additional section at said second angle produce a cycle of slow and fast forward movement of the soil in contact with the auger when the auger is drawn forward, and wherein said auger has at least two said sections and additional sections to define at least two said cycles.

7. In a plow an auger, means for drawing said auger in a substantially axial direction, means for mounting said auger for resilient upwards and downwards movement with its axis substantially in the direction of travel of the means for drawing the auger, means for rotating the auger in a direction opposing forward motion of the means for drawing the auger, said auger comprising a plurality of generally helical turns having a ground engaging section ot its periphery shaped to meet the soil in a plane which is at a first angle to the axis of the auger selected to result in ground engaged by said section of the periphery having a small forward component of movement and at least one additional section of the periphery shaped to meet the soil in a plane which is at a second angle to the axis of the auger selected to result in ground engaged by the additional section having a large forward component of movement when the auger is drawn forward.

8. A plow as claimed in claim 7 comprising a deflector shoe in advance of the auger having a leading surface sloping upwardly to cause the auger to be raised over obstacles.

9. A plow as claimed in claim 7 comprising a deflector shoe in advance of the auger having a leading surface sloping upwardly to cause the auger to be raised over obstacles and in which the diameter of at least the front turn of the auger is selected so that the periphery of said turn of the auger will be in substantial alignment with the sloping leading surface of the deflector shoe.

10. A plow as claimed in claim 7 comprising means additional to the means for mounting the auger for resilient upward and downward movement, for raising and lowering the auger to vary the depth of plowing.

11. In a plow an auger, means for drawing said auger in a substantially axial direction, means for rotating the auger in a direction opposing forward motion of the means for drawing the auger, said auger comprising a plurality of helical turns having a periphery scalloped to provide ground engaging generally convex teeth, said teeth including a first series of consecutive teeth disposed to meet the soil in planes which are at a first angle to the axis of the auger selected to result in ground engaged by said first series of teeth having a small forward component of movement and at least one additional series of consecutive teeth disposed to meet the soil in planes which are at a second angle to the axis of the auger selected to result in ground engaged by said additional series of teeth having a large forward component of movement when the auger is drawn forward.

12. A device as claimed in claim 11 in which the auger has at least two turns.

13. A device as in claim 1 or 11, in which the auger has sufficient numbers of series of generally convex teeth moving in planes at different angles to provide at least two cycles, each cycle comprising slow and fast forward movement of soil in contact with the auger when the auger is travelling forward.

14. A device as in claim 1 or 11, in which the teeth are not symmetrical from one turn to another, so as to avoid alignment of the teeth in the axial direction.

15. In a plow an auger, means for drawing said plow, means for mounting said auger for resilient upwards and downwards movement with its axis substantially in the direction of travel of the plow, means for rotating the auger in a direction opposing forward motion of the plow, said auger comprising a plurality of helical turns having a periphery scalloped to provide ground engaging convex teeth, said teeth including a first series of consecutive teeth disposed to meet the soil in planes which are at a first angle to the axis of the auger selected to result in ground engaged by said first series of teeth having a small forward component of movement and at least one additional series of consecutive teeth disposed to meet the soil in planes which are at a second angle to the axis of the auger selected to result in ground engaged by said additional series of teeth having a large forward component of movement when the auger is drawn forward.

16. In a plow an auger, means for drawing said plow, means for mounting said auger for resilient upwards and downwards movement with its axis substantially in the direction of travel of the plow, said means for mounting comprising also means permitting limited movement about a vertical axis, resilient means urging the auger to return to a position with its axis in alignment with the direction of travel of the plow in the event of said movement about a vertical axis, means for rotating the auger in a direction opposing forward motion of the plow, said auger comprising a plurality of helical turns having a periphery scalloped to provide ground engaging convex teeth, said teeth including a first series of consecutive teeth disposed to meet the soil in planes which are at a first angle to the axis of the auger selected to result in ground engaged by said teeth having a small forward component of movement and at least one additional series of consecutive teeth disposed to meet the soil in planes which are at a second angle to the axis of the auger selected to result in ground engaged by said additional series of teeth having a large forward component of movement when the auger is drawn forward.

17. A plow comprising an upwardly extending support member mounted on a vehicle, an auger type plow member, means for mounting said plow member with the axis of its auger extending in the direction of travel of the vehicle, driving means for rotating the auger on said means for mounting in a direction opposing forward motion of the vehicle, connecting links providing a parallelogram linkage between the upwardly extending supporting member and the means for mounting the plow member so that the auger can be raised and lowered without changing the relationship between the axis of the auger and the horizontal, means for raising and lowering the means for mounting the plow member and spring means acting on the parallelogram linkage to cause the auger to exert downward pressure on the ground while permitting the auger to rise to override obstacles; said auger comprising a plurality of helical turns having a periphery scalloped to provide ground engaging convex teeth, said teeth including a first series of consecutive teeth disposed to meet the soil in planes which are at a first angle to the axis of the auger selected to result in ground engaged by said teeth having a small forward component of movement and at least one additional series of consecutive teeth disposed to meet the soil in planes which are at a second angle to the axis of the auger selected to result in ground engaged by said additional series of teeth having a large forward component of movement when the auger is drawn forward.

18. A plow as in claim 17, in which the upwardly extending supporting member is pivoted for rotation about a vertical axis against the opposition of buffer springs to provide the plow member with the ability to deflect to one side of obstructions.

19. A plow as in claim 17, in which the plow member includes a shoe in advance of the auger, said shoe having a forwardly and upwardly inclined contour to cause the auger to ride over obstacles.

20. A plow as in claim 17, in which the auger is mounted to be disposed laterally of the vehicle.

* * * * *